United States Patent
Moon

(10) Patent No.: US 8,133,603 B2
(45) Date of Patent: Mar. 13, 2012

(54) BATTERY AND CASE OF BATTERY PACK

(75) Inventor: Deayon Moon, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 918 days.

(21) Appl. No.: 12/216,520

(22) Filed: Jul. 7, 2008

(65) Prior Publication Data

US 2009/0029241 A1    Jan. 29, 2009

(30) Foreign Application Priority Data

Jul. 25, 2007  (KR) ........................ 10-2007-0074565

(51) Int. Cl.
*H01M 2/10* (2006.01)
*H01M 2/02* (2006.01)
*H05K 7/00* (2006.01)

(52) U.S. Cl. ...... 429/100; 429/99; 429/159; 361/679.59

(58) Field of Classification Search ........................ None
See application file for complete search history.

(56) References Cited

U.S. PATENT DOCUMENTS

| | | | |
|---|---|---|---|
| 6,535,378 B1 * | 3/2003 | Oguchi et al. ........... | 361/679.55 |
| 2008/0226978 A1 * | 9/2008 | Kim et al. ..................... | 429/163 |

FOREIGN PATENT DOCUMENTS

| | | |
|---|---|---|
| JP | 1995-176298 | 7/1995 |
| JP | 2000-265659 | 9/2000 |
| JP | 2000-315485 A | 11/2000 |
| JP | 2003-017019 | 1/2003 |
| KR | 1020000015209 A | 3/2000 |
| KR | 1020020093433 A | 12/2002 |
| KR | 1020060027268 A | 3/2006 |

* cited by examiner

*Primary Examiner* — Jonathan Crepeau
(74) *Attorney, Agent, or Firm* — Robert E. Bushnell, Esq.

(57) ABSTRACT

Disclosed is a battery pack that includes a bare cell for producing electricity, a circuit board electrically coupled to the bare cell, and a case for accommodating the bare cell and circuit board. The case has a foot rubber installing part formed on an outer surface of the case, and the foot rubber installing part has a tub for accommodating a foot rubber. The tub has a receiving groove formed on an inner surface of the tub. The receiving groove is an extra space that does not accommodate the foot rubber. The receiving groove stores an excess of glue material that is used to couple the foot rubber to the foot rubber installing part.

16 Claims, 6 Drawing Sheets

BATTERY AND CASE OF BATTERY PACK

CLAIM OF PRIORITY

This application makes reference to, incorporates the same herein, and claims all benefits accruing under 35 U.S.C. §119 from an application earlier filed in the Korean Intellectual Property Office on 25 Jul. 2007 and there duly assigned Serial No. 10-2007-0074565.

BACKGROUND OF THE INVENTION

1. Field of the Invention

The present invention relates to a battery pack, and more particularly, to a battery pack that can improve productivity by preventing appearance defects that is caused by an overflowing glue material that is used to install a foot rubber on the battery pack.

2. Description of the Related Art

Generally, a battery pack uses a chargeable/dischargeable secondary battery because of its low cost. The secondary batteries include a nickel-cadmium (Ni—Cd) battery, a nickel-hydride (Ni-MH) battery, a lithium (Li) battery, a lithium-ion (Li-ion) battery and a lithium polymer battery.

The battery pack may be classified into a core pack in which only a protection circuit is mounted on a chargeable/dischargeable bare cell, a soft pack in which tubing is performed after a protection circuit is mounted on a bare cell, and a hard pack in which a hard case is formed after a protection circuit is mounted on a bare cell.

The bare cell means a battery itself in which additional elements such as the protection circuit and the like are completely not mounted and is classified into a prismatic type, a pouch type and a cylindrical type according to its shape. A plurality of cylindrical type bare cells is generally used for battery pack of a high capacity such as a notebook computer. The cylindrical type bare cells are mounted on the battery pack for the notebook computer, and are electrically coupled to each other in series and/or in parallel. Further, a separator plate of a certain width is provided on the bare cells coupled in series and/or parallel, and a circuit board provided with a protection circuit is located on the separator plate. In addition, the circuit board and the bare cells are electrically coupled by a plurality of conducting wires. Here, the separator plate insulates the circuit board from the bare cells and simultaneously supports the circuit board.

In a battery pack installed in a device such as a notebook computer, the hard case of the battery pack includes a foot rubber provided at a corner of a bottom surface of the hard case for buffering the hard case against external impact from a surface the hard case is laid on.

FIG. 1 is a perspective view illustrating a foot rubber installing part of a battery pack. FIG. 1 shows a foot rubber installing part 152' provided at a corner of a bottom surface of a case 150'. The battery pack shown in FIG. 1, however, has a problem that glue (bond) overflows out of the case 150' when the foot rubber installing part 152' is filled with the glue, and a foot rubber 151' is inserted into the foot rubber installing part 152'.

FIG. 2 is a sectional view illustrating the foot rubber installing part of the case of the battery pack. FIG. 2 shows the overflowing glue through edges of the foot rubber 151' when the foot rubber 151' is installed into the foot rubber installing part 152'.

Therefore, as described above, there is a problem that productivity of manufacturing the battery pack is reduced because of an appearance defect caused by the overflowing glue material when the glue overflows out of the foot rubber installing part of the case.

SUMMARY OF THE INVENTION

Accordingly, an object of the present invention is to provide a battery pack that can improve productivity by preventing appearance defects caused by overflowing glue material by providing a receiving groove that stores an excess of the glue material that is used for installing a foot rubber.

Additional advantages, objects and features of the invention will be set forth in part in the description which follows and in part will become apparent to those having ordinary skill in the art upon examination of the following or may be learned from practice of the invention.

According to an aspect of the present invention, there is provided a battery pack, which includes at least one bare cell for producing electricity, a circuit board electrically coupled to the bare cell, and a case for accommodating the bare cell and circuit board. The case has a foot rubber installing part formed on an outer surface of the case. The foot rubber installing part has a tub for accommodating a foot rubber. The tub has a receiving groove formed on an inner surface of the tub. The receiving groove does not accommodate the foot rubber.

The receiving groove may be formed at an inner corner where a bottom and a side wall of the tub of the foot rubber installing part contact with each other. The receiving groove may be formed on a bottom surface of the tub or on a side wall of the tub. A cross section of the receiving groove, which is cut substantially parallel to the outer surface of the case, may have a line, a curved, a rectangular, a triangular, an oval, or a circular shape.

The foot rubber installing part may have a dam protruding from the outer surface of the case, the tub being formed on the top of the dam. The tub of the foot rubber installing part may be formed on the outer surface of the case, a bottom surface of the tub being recessed from the outer surface of the case. A cross section of the tub, which is cut substantially parallel to the outer surface of the case, may have a rectangular, an oval, or a circular shape.

The battery pack may further include a separator plate located between the bare cell and the circuit board, the separator plate supporting the circuit board. The separator plate may include a plane surface part and a curved surface part, the plane surface part supporting the circuit board and the curved surface part surrounding a side surface of the bare cell. The plane surface part of the separator plate may include a plurality of exhaust holes, through which an electrolyte flows back into the bare cell whenever the electrolyte permeates over the separator plate or the circuit board.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein the above and other objects, features and advantages of the present invention will be more apparent from the following detailed description taken in conjunction with the accompanying drawing, in which.

DETAILED DESCRIPTION OF THE INVENTION

Figure 1:
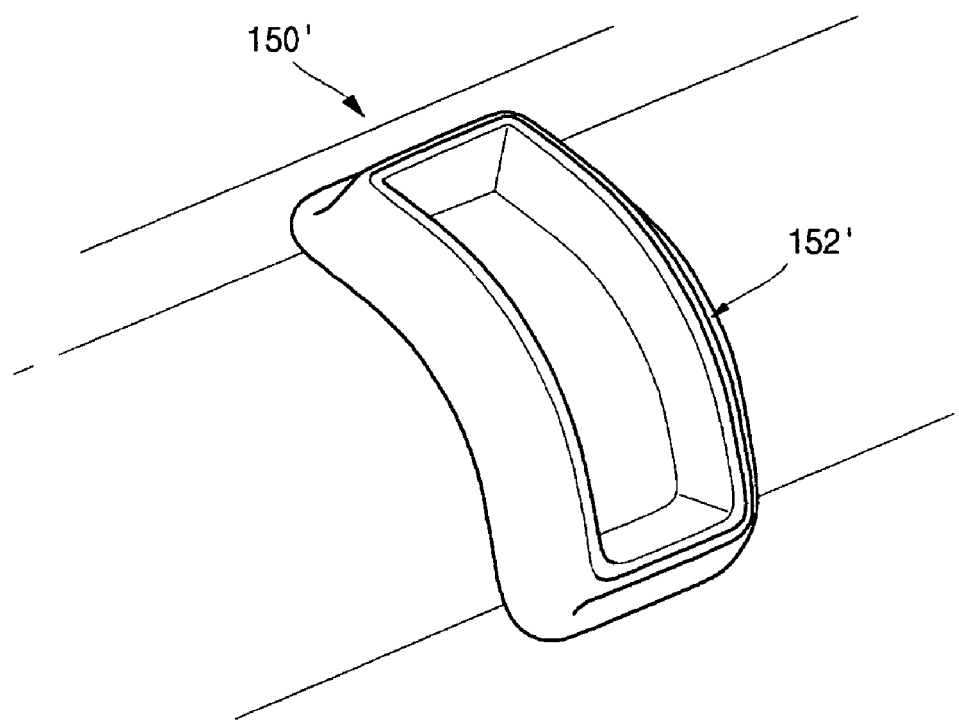
FIG. 1 is a perspective view illustrating a foot rubber installing part of a case of a battery pack.
Figure 2:
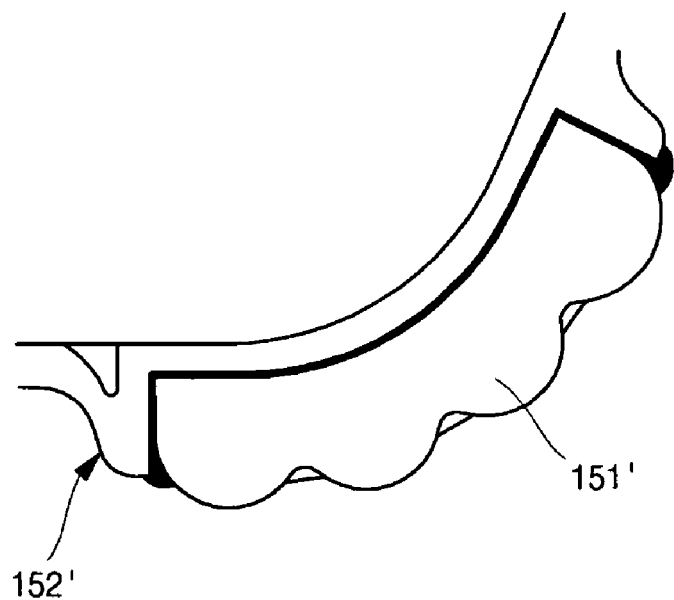
FIG. 2 is a sectional view illustrating a foot rubber installed in the foot rubber installing part and glue material overflowing from the foot rubber installing part.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 3:
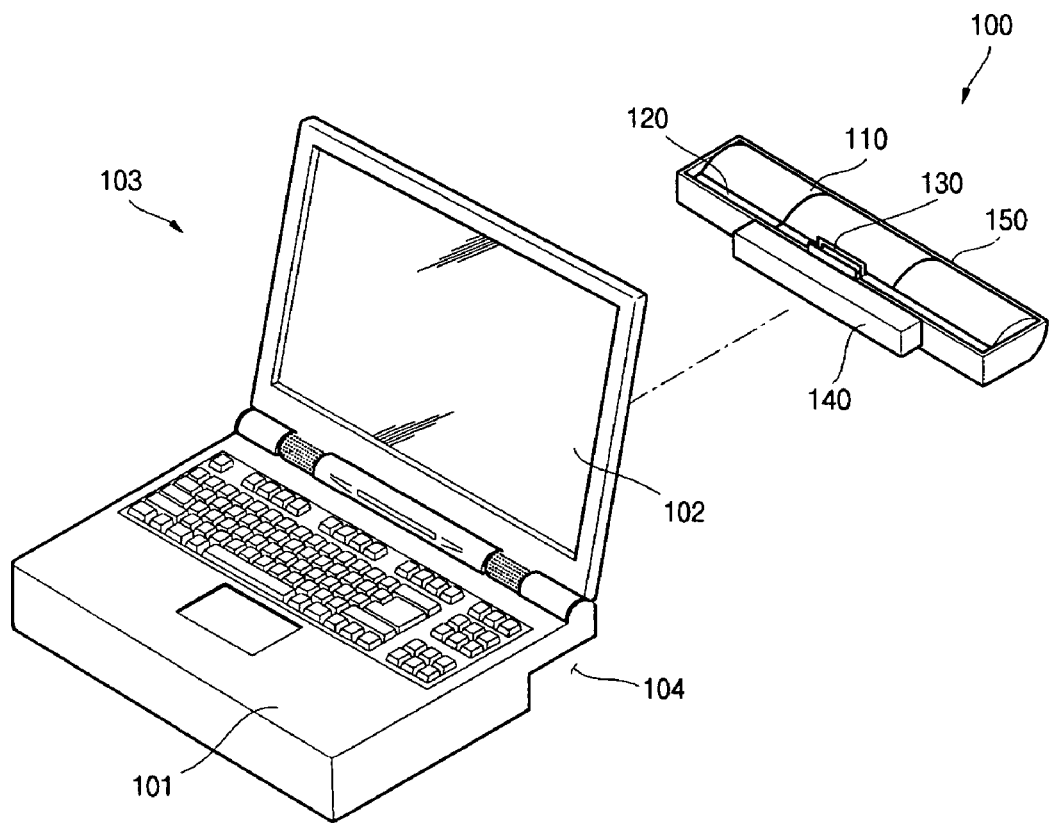
FIG. 3 is a perspective view illustrating a battery pack of one exemplary embodiment of the present invention to be mounted in a notebook computer.
Figure 4:
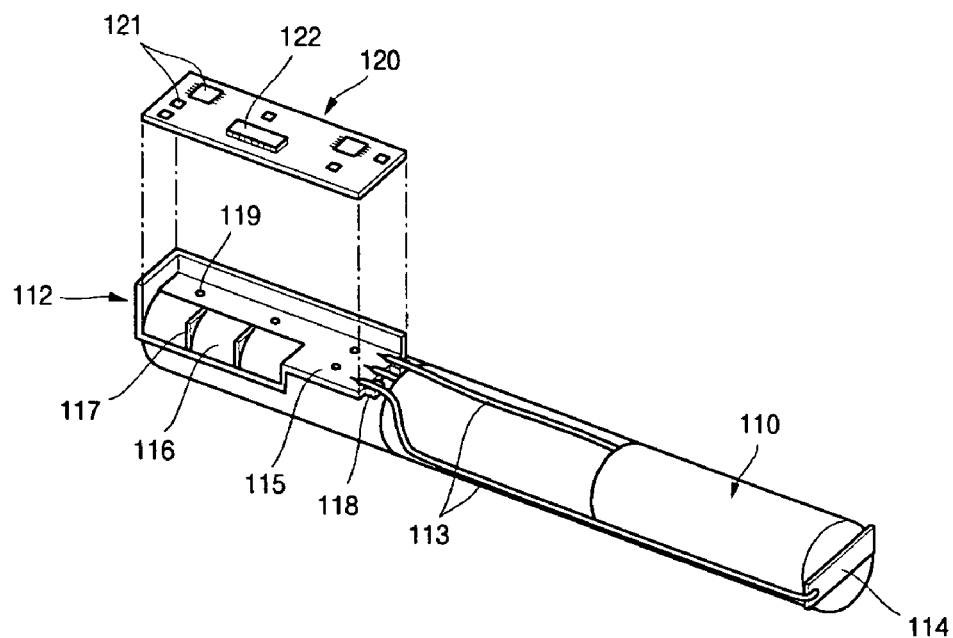
FIG. 4 is a perspective view illustrating a bare cell, a separator plate and a circuit board of the battery pack.

FIG. 3 is a perspective view illustrating a battery pack according to one exemplary embodiment of the present invention, which is mounted on a notebook computer, and FIG. 4 is a perspective view illustrating a bare cell, a separator plate and a circuit board of the battery pack.

Referring to FIG. 3, the battery pack 100 is attachable to a fixing part 104 formed on a rear part of a notebook computer 103. The notebook computer 103 includes a main body 101 and a display part 102. The fixing part 104 is provided with an opening having predetermined space on the rear part of the main body 101, thereby allowing the battery pack 100 to be electrically and mechanically attachable and detachable to the fixing part 104.

Referring to FIGS. 3 and 4, the battery pack 100 includes at least one bare cell 110, a separator plate 112, a circuit board 120, a flexible wiring film 130, a connector 140, and a case 150.

The bare cell 110 may be any one of general nickel-cadmium (Ni—Cd) battery, nickel-hydride (Ni-MH) battery, lithium (Li) battery, lithium-ion (Li-ion) battery and lithium polymer battery and the like, but not limited thereto. In FIG. 4, the bare cell 110 is illustrated as a cylindrical type, but may be a prismatic type or a pouch type and the like. The plurality of bare cells 110 may be connected in series and/or parallel, and the connecting member may be a lead plate 114. One end of a wire 113 is connected to a lead plate 114, and the other end of the wire 113 is connected to the circuit board 120.

The separator plate 112 may be located between any one of the plurality of bare cells 110 and a circuit board 120. The separator plate 112 includes an substantially flat plane surface part 115 located on an upper part of the bare cell 110, and a curved surface part 116 surrounding a side surface of the bare cell 110. A plurality of vertical plates 117 may be formed at the curved surface part 116. As shown in FIG. 4, the upper surface of the vertical plate 117 is the same level as the plane surface part 115. Accordingly, the circuit board 120 is seated on the plane surface part 115 of the separator plate 112 and on the upper surface of the vertical plates 117. A hook 118 protruded with a predetermined depth is formed at one end of the plane surface part 115 of the separator plate 112. A wire 113 is connected, fixed and arranged to the hook 118 so as to couple the lead plate 114 bonded to the bare cell 110 to the circuit board 120. Accordingly, there is no need to attach the wire 113 to the separator plate 112 or the surface of the bare cell 110 using a tape or the like for fixing the wire 113. Furthermore, a plurality of exhaust holes are formed on the plane surface part 115 of the separator plate 112 so as to discharge an electrolyte toward the bare cell 110 below the separator plate 112 if the electrolyte is permeated over the upper part of the separator plate 112 or the circuit board 120.

The circuit board 120 is seated on the upper surface of the separator plate 112, and is electrically coupled to the bare cell 110. Specifically, the circuit board 120 is seated on the plane surface part 115 of the separator plate 112 and the upper surface of the vertical plate 117. The circuit board 120 includes a protective circuit so as to prevent over-charge and over-discharge of the bare cell 110. The protective circuit is comprised of a plurality of semiconductor devices 121, and is connected to an external device through a connecting element 122.

The flexible wiring film 130 electrically couples the circuit board 120 to the connector 140. The connector 140 is electrically coupled to the main body 101 of the notebook computer 103.

Figure 5:
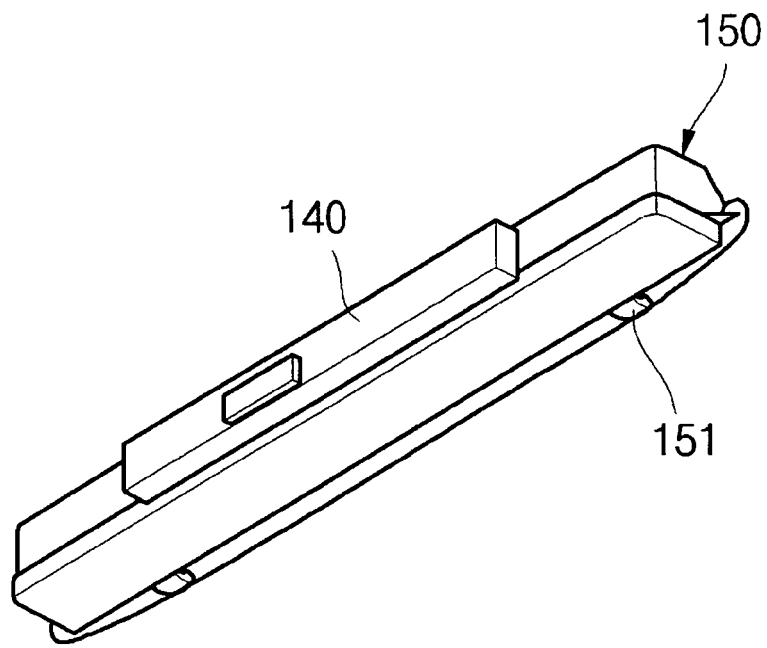
FIG. 5 is a perspective view illustrating a case of the battery pack.
Figure 6:
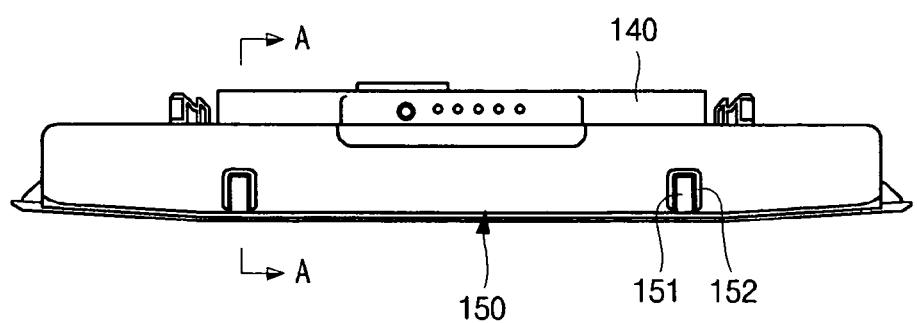
FIG. 6 is another view illustrating the case of the battery pack.
Figure 7:
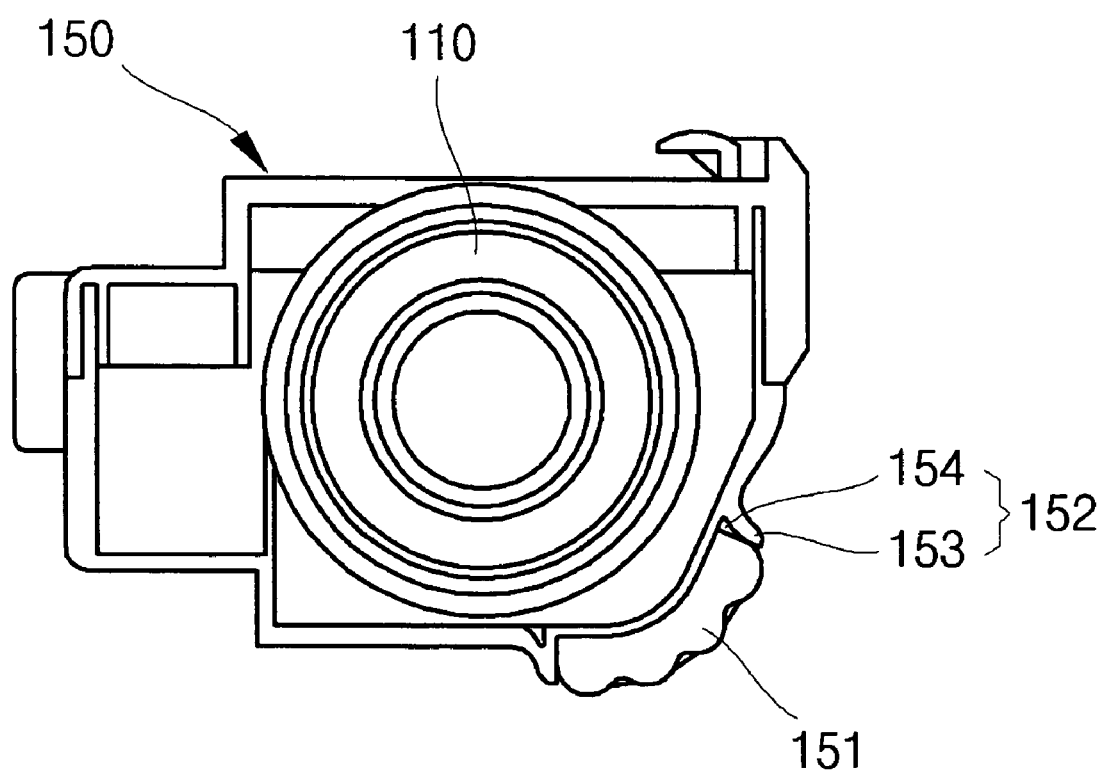
FIG. 7 is a sectional view taken along an A-A line of FIG. 6.

FIG. 5 is a perspective view illustrating a case of the battery pack when observed from the bottom, FIG. 6 is another view illustrating the case of the battery pack, and FIG. 7 is a sectional view taken along an A-A line of FIG. 6.

Referring to FIGS. 5 to 7, the case 150 of the battery pack 100 is formed in a shape that can receive the bare cell 110, circuit board 120, flexible wiring film 130, and connector 140. The case 150 includes a foot rubber installing part 152 formed on an outer surface of the case 150 for installing a foot rubber 151. When the battery pack 100 is installed in the notebook computer 103, the foot rubber 151 is being positioned at the bottom of the notebook computer 103. Therefore, the foot rubber 151 buffers the notebook computer 103 against external impact that can be applied from a surface on which the notebook computer 103 is laid. The foot rubber installing part 152 is formed in a shape of recess or has a tub to accommodate a foot rubber 151. As shown in FIG. 7, the foot rubber installing part 152 can have a dam protruding from the outer surface of the case 150, and a receiving groove 154 that is an extra space that does not accommodate the foot rubber. The structure and function of the receiving groove 154 will be described in detail in the following paragraphs.

Figure 8:
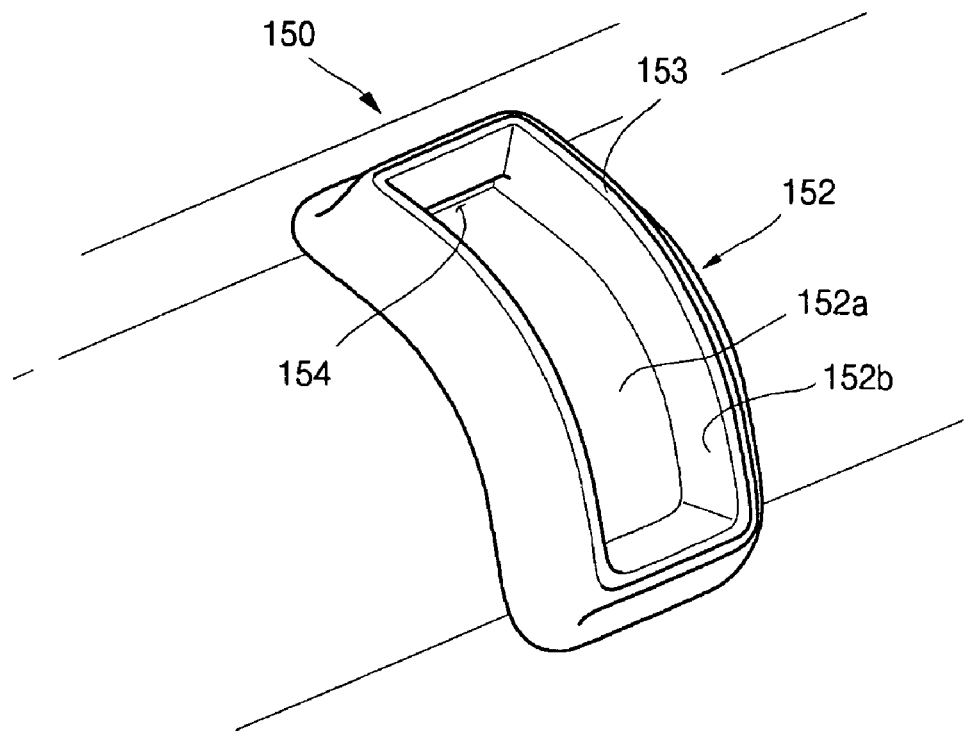
FIG. 8 is a perspective view illustrating a foot rubber installing part of the case of the battery pack constructed as one embodiment of the present invention.
Figure 9:
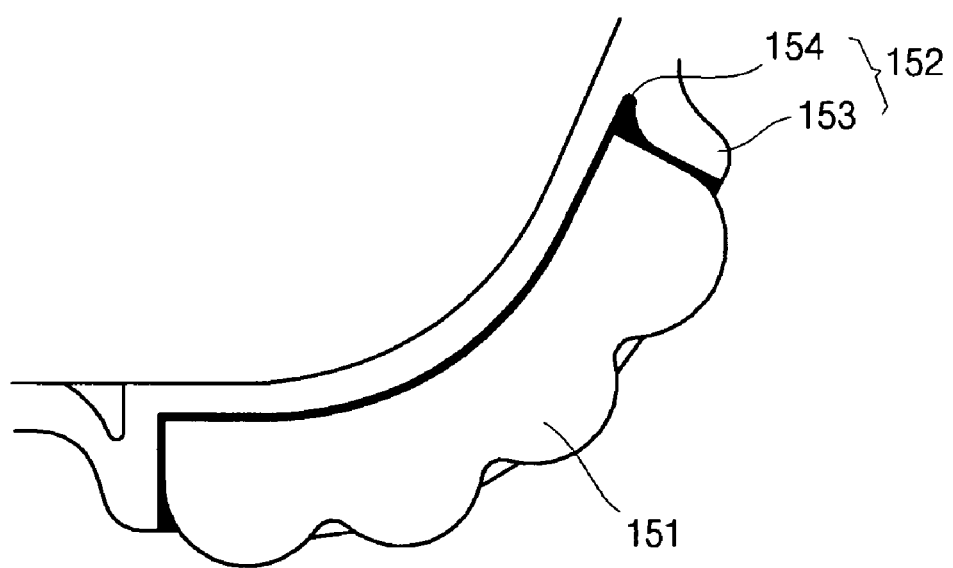
FIG. 9 is a sectional view illustrating the foot rubber installing part of the case of the battery pack of the embodiment of the present invention.

FIG. 8 is a perspective view illustrating a foot rubber installing part of the case of the battery pack, which is constructed as one embodiment of the present invention, and FIG. 9 is a sectional view illustrating the foot rubber installing part of the embodiment shown in FIG. 8.

Referring to FIG. 8, the foot rubber installing part 152 includes a dam 153 projected outwardly from an outer surface of the case 150. A recessed portion or a tub is formed in the inside of the dam 153 as shown in FIG. 8. The tub has a bottom surface 152a and a side wall 152b, and a hollow or an empty space, which is surrounded by the bottom surface 152a and the side wall 152b. As shown in FIG. 9, a foot rubber is received in the hollow of the tub. A receiving groove 154 is formed at an inner surface of the tub. The receiving groove 154 is an extra space that is not accommodated by the foot rubber 151. In order to install the foot rubber 151 in the foot rubber installing part 152, a glue material is first spread inside the tub of the foot rubber installing part 152. The glue material rigidly bonds the foot rubber 151 to the foot rubber installing part 152. In the case that the glue material is too much applied in the tub, the excess of the glue material can be stored in the receiving groove 154, which prevents overflowing of the glue material out of the foot rubber installing part 152 and accordingly prevents an appearance defect that can be caused by the overflowing glue.

A plan view of the foot rubber installing part 152 is formed of a rectangular shape as shown in FIG. 8, but may be formed of an oval or a circular shape. The receiving groove 154 is formed at an inner corner where the bottom surface 152a and the side wall 152b of the tub of the foot rubber installing part 152 contact with each other, but may be formed at another location separated by a predetermined distance from the inner corner of the foot rubber installing part 152. For example, the receiving groove 154 can be formed on the bottom surface 152a or the side wall 152b. Further, the receiving groove 154 is formed at the part of the inner corner of the foot rubber installing part 152 in FIG. 8, but may be formed at an entire portion of the corner of the foot rubber installing part 152. In addition, the plan view (or a cross section) of the receiving groove 154, which is cut substantially parallel to the outer surface of the case, is formed in a line shape in FIG. 8, but may be formed in a curved, a rectangular, a triangular, an oval, or a circular shape.

Referring to FIG. 9, when the foot rubber installing part 152 is filled with the glue (or bond) and the foot rubber 151 is attached by using the bond during manufacturing of the battery pack 100, the overflowing bond is received in the receiving groove 154, thereby preventing the bond from overflowing. When the overflowing bond is received in the receiving groove 154, the bond does not overflows out of the case 150, thereby preventing appearance defect of the battery pack 100. Thus, the productivity of the battery pack can be improved.

Figure 10:
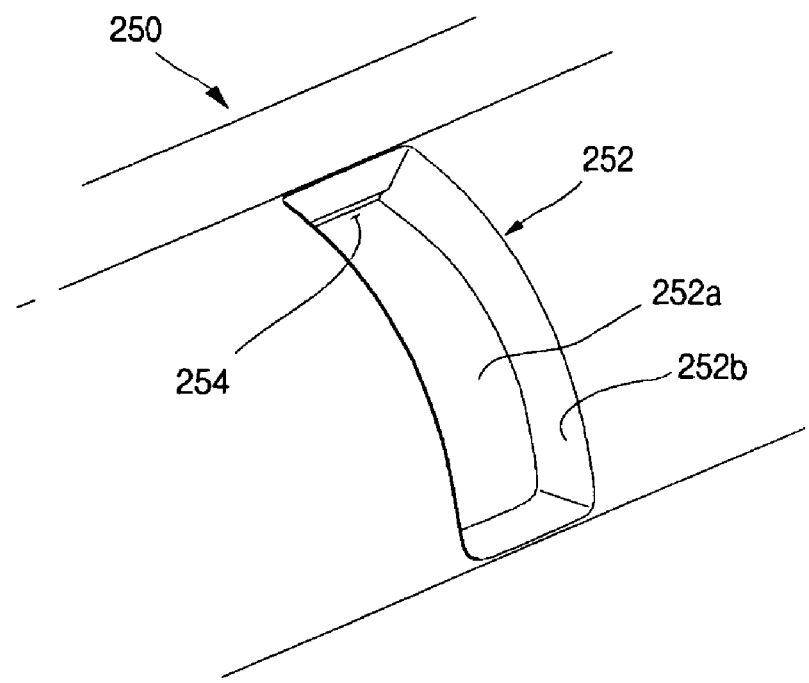
FIG. 10 is a perspective view illustrating a foot rubber installing part of a case of a battery pack constructed as another exemplary embodiment of the present invention.
Figure 11:
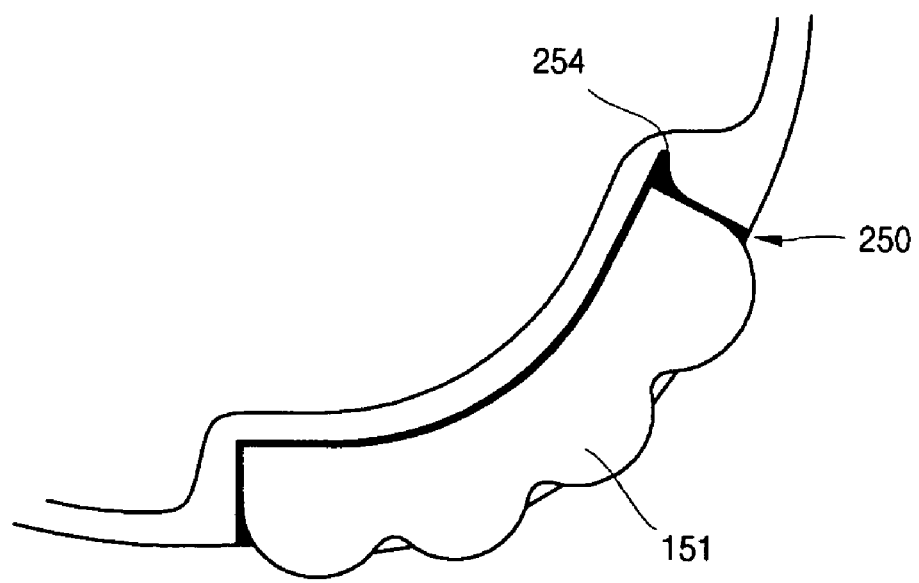
FIG. 11 is a sectional view illustrating the foot rubber installing part of the case of the battery pack of another exemplary embodiment.

A foot rubber installing part of a case of a battery pack according to another exemplary embodiment of the present invention will be explained. FIG. 10 is a perspective view illustrating a foot rubber installing part of a case of a battery pack constructed as another exemplary embodiment of the present invention, and FIG. 11 is a sectional view illustrating the foot rubber installing part of the case of the battery pack of another exemplary embodiment.

The battery pack according to another exemplary embodiment is in principle the same as that of the embodiment described above except that the foot rubber installing part is formed in a shape of recess that is concaved from a part of a lower surface of the case to an inside of the case. Thus, the same drawing reference numerals are used for the same elements and explanation about them will be omitted. In other words, a constitution of the foot rubber installing part and combination of the foot rubber installing part and foot rubber will be mainly explained.

The battery pack of another embodiment includes at least one bare cell 110, a separator plate 112, a circuit board 120, a flexible wiring film 130, a connector 140, and a case 250.

The case 250 of the battery pack 100 is formed in a shape that can receive the bare cell 110, circuit board 120, flexible wiring film 130, and connector 140, and includes a foot rubber installing part 252 formed at one end of its outer surface for installing a foot rubber 151 buffering the case 250 against external impact.

Referring to FIG. 10, the foot rubber installing part 252 is formed in the shape of recess (or a tub) that is concaved from the part of the lower surface of the case 250 to the inside of the case, and includes a receiving groove 254 formed at one end part of the recess. The foot rubber installing part 252 is formed in the shape of recess that is concaved from the part of the lower surface of the case 250 to the inside of the case, which is different from the foot rubber installing part 152 of FIG. 7 formed in the recess shape of being projected outwardly from the case 150. Thus, there is an advantage that an empty space formed between the surface of the case 250 and the bare cell 110 is usable, thereby reducing total size of the battery pack.

A plan view of the foot rubber installing part 252 is formed of a rectangular recess shape as shown in FIG. 10, but may be formed of a circular shape. In addition, in FIG. 10, the receiving groove 254 is formed at an inner corner where a bottom surface 252a and a side wall 252b of the foot rubber installing part 252 contact with each other, but may be formed being separated by a predetermined distance from the inner corner of the foot rubber installing part 252. Further, the receiving groove 254 is formed at the part of the inner corner of the foot rubber installing part 252 in FIG. 10, but may be formed at an entire portion of the corner of the foot rubber installing part 252. In addition, the plan view of the receiving groove 254 is formed in a line shape in FIG. 10, but may be formed in a curved, a rectangular, a triangular, or a circular shape.

Referring to FIG. 11, when the foot rubber installing part 252 is filled with a bonding material (glue or bond) and the foot rubber 151 attached by using the bond during manufacturing of the battery pack 100, the overflowing bond is received in the receiving groove 254, thereby preventing the bond from overflowing.

When the overflowing bond is received in the receiving groove 254, the bond does not overflow out of the case 250, thereby preventing appearance defect of the battery pack. Thus, the productivity of the battery pack can be improved.

As described above, the battery pack according to the present invention produces the following effect. The overflowing bond is received in the receiving groove formed inside the foot rubber installing part of the case when the bond is filled for installing the foot rubber, thereby preventing appearance defect of the battery pack. Thus, the productivity of the battery pack can be improved.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A battery pack comprising:
   at least one bare cell for producing electricity;
   a circuit board electrically coupled to the bare cell; and
   a case for accommodating the bare cell and circuit board,
   the case having a foot rubber installing part formed on an outer surface of the case, the foot rubber installing part having a tub for accommodating a foot rubber, the tub having a receiving groove formed on an inner surface of the tub.

2. The battery pack of claim 1, wherein the receiving groove is formed at an inner corner of the tub on which a bottom surface of the tub contacts a side wall of the tub.

3. The battery pack of claim 1, wherein the receiving groove is formed on a bottom surface of the tub or on a side wall of the tub.

4. The battery pack of claim 1, wherein a cross section of the receiving groove, which is cut substantially parallel to the outer surface of the case, has a shape selected from the group consisting of a line, a curved, a rectangular, a triangular, an oval, and a circular shapes.

5. The battery pack of claim 1, wherein the foot rubber installing part has a dam protruding from the outer surface of the case, the tub being formed in the inside of the dam.

6. The battery pack of claim 1, wherein the tub of the foot rubber installing part is formed on the outer surface of the case, a bottom surface of the tub being recessed from the outer surface of the case.

7. The battery pack of claim 1, wherein a cross section of the tub, which is cut substantially parallel to the outer surface of the case, has a shape selected from the group consisting of a rectangular, an oval, and a circular shapes.

8. The battery pack of claim 1, further includes a separator plate located between the bare cell and the circuit board, the separator plate supporting the circuit board.

9. The battery pack of claim 8, wherein the separator plate includes a plane surface part and a curved surface part, the plane surface part supporting the circuit board and the curved surface part surrounding a side surface of the bare cell.

10. The battery pack of claim 9, wherein the plane surface part of the separator plate includes a plurality of exhaust holes, through which an electrolyte flows back into the bare cell whenever the electrolyte permeates over the separator plate or the circuit board.

11. A case of a battery pack for receiving a bare cell that produces electricity, the case comprising:
a foot rubber installing part formed on an outer surface of the case, a foot rubber being installed in the foot rubber installing part, the foot rubber installing part having a receiving groove formed at a position in which the foot rubber is installed, the receiving groove not accommodating the foot rubber.

12. The case of claim 11, wherein the foot rubber installing part has a tub for accommodating the foot rubber, the receiving groove being formed on an inner surface of the tub.

13. The case of claim 12, wherein the receiving groove is formed at an inner corner of the tub on which a bottom surface of the tub contacts a side wall of the tub.

14. The case of claim 12, wherein the receiving groove is formed on a bottom surface of the tub or on a side wall of the tub.

15. The case of claim 12, wherein the foot rubber installing part has a dam protruding from the outer surface of the case, the tub being formed in an inside of the dam.

16. The case of claim 12, wherein a bottom surface of the tub is recessed from the outer surface of the case.

* * * * *